United States Patent
Helle et al.

(10) Patent No.: US 12,199,520 B2
(45) Date of Patent: Jan. 14, 2025

(54) MEDIUM VOLTAGE SAFETY PROCEDURE AND HOUSING

(71) Applicant: VESTAS WIND SYSTEMS A/S, Aarhus N. (DK)

(72) Inventors: Lars Helle, Suldrup (DK); Cem Özgür Gerçek, Regensburg (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/769,282

(22) PCT Filed: Oct. 14, 2020

(86) PCT No.: PCT/DK2020/050286
§ 371 (c)(1),
(2) Date: Apr. 14, 2022

(87) PCT Pub. No.: WO2021/073704
PCT Pub. Date: Apr. 22, 2021

(65) Prior Publication Data
US 2024/0146209 A1    May 2, 2024

(30) Foreign Application Priority Data
Oct. 16, 2019    (DK) .......................... PA 2019 70645

(51) Int. Cl.
*H02B 13/00*    (2006.01)
*F03D 80/50*    (2016.01)
(Continued)

(52) U.S. Cl.
CPC ............ *H02M 7/003* (2013.01); *F03D 80/50* (2016.05); *H02B 1/06* (2013.01); *H02B 13/075* (2013.01);
(Continued)

(58) Field of Classification Search
None
See application file for complete search history.

(56) References Cited

U.S. PATENT DOCUMENTS 9,782,710 B2 *   10/2017   Jain ..................... B01D 46/62
10,415,751 B2 *   9/2019   Geiken ................ H01H 27/06
(Continued)

FOREIGN PATENT DOCUMENTS

EP    2141788 A2    1/2010
EP    2913925 A1    9/2015
(Continued)

OTHER PUBLICATIONS

Danish Patent and Trademark Office, 1st Technical Examination Including The Search Report and Search Opinion for Application PA 2019 70645 dated Apr. 23, 2020.
(Continued)

*Primary Examiner* — Courtney L Smith
(74) *Attorney, Agent, or Firm* — Patterson + Sheridan, LLP

(57) ABSTRACT

A wind turbine system with a medium voltage (MV) converter system for converting electric power by the wind turbine generator. A housing, e.g. a placed on the ground near the wind turbine tower, encloses the MV converter to block access. An access door with a controllable locking mechanism is controlled by an access control system which unlocks the access door after execution of a safety access algorithm. This allows a person to provide service to the potentially dangerous MV equipment in a safe an automated way after request. The housing preferably has a control compartment where a person can request access and await opening of the access door for safe access to the MV converter.

17 Claims, 3 Drawing Sheets

(51) Int. Cl.
*H02B 1/06* (2006.01)
*H02B 13/075* (2006.01)
*H02K 7/18* (2006.01)
*H02M 7/00* (2006.01)

(52) U.S. Cl.
CPC ........ *H02K 7/183* (2013.01); *F05B 2220/706* (2013.01)

(56) References Cited

U.S. PATENT DOCUMENTS

| | | | | |
|---|---|---|---|---|
| 11,183,843 | B1* | 11/2021 | Cooper | H02J 1/10 |
| 2010/0013227 | A1 | 1/2010 | Weitkamp | |
| 2011/0181045 | A1 | 7/2011 | Letas et al. | |
| 2017/0265315 | A1 | 9/2017 | Kuzniak et al. | |
| 2018/0061603 | A1* | 3/2018 | Hendrixson, III | H02J 13/00036 |
| 2018/0224063 | A1 | 8/2018 | Geiken et al. | |
| 2019/0173268 | A1 | 6/2019 | Kuzniak et al. | |

FOREIGN PATENT DOCUMENTS

| | | | |
|---|---|---|---|
| EP | 2141788 B1 * | 8/2016 | ........... H02H 7/1216 |
| EP | 3188335 A1 | 7/2017 | |
| WO | 2012000516 A2 | 1/2012 | |
| WO | 2021073704 A1 | 4/2021 | |

OTHER PUBLICATIONS

PCT, International Search Report for Application PCT/DK2020/050286 dated Dec. 14, 2020.
PCT, Written Opinion of The International Searching Authority for Application PCT/DK2020/050286 dated Dec. 14, 2020.

* cited by examiner

MEDIUM VOLTAGE SAFETY PROCEDURE AND HOUSING

FIELD OF THE INVENTION

The present invention relates to the field of electric power, especially medium voltage electric power generated in a wind turbine. Specifically, the invention relates to an enclosure for safely housing medium voltage equipment and a safety procedure for providing safe person access to the medium voltage equipment.

BACKGROUND OF THE INVENTION

Within wind turbine generators, e.g. high power wind turbines, the use of electric converters for handling medium voltages (MV), i.e. above 1,000 V AC and above 1,500 V DC, have emerged. However, service of equipment for handling MV equipment requires another level of attention than service of low voltage equipment. Safety procedures are necessary for personnel to be able to access MV equipment in order to eliminate lethal accidents in case of contact with MV electrical parts. Especially, if modular multi-level converters (MMCs) are used in the conversion of electric energy from the wind turbine generator to the public electric network, numerous capacitors present potential lethal voltages from which a person needs to be protected.

At the same time, while preserving safety, it is an important feature that such MV equipment service can be handled in a time efficient manner, so as to reduce waste time where the wind turbine is incapable of delivering electric power to the public network.

SUMMARY OF THE INVENTION

Thus, according to the above description, it is an object of the present invention to provide a wind turbine system which is safe and yet time efficient to service.

In a first aspect, the invention provides a wind turbine system arranged to generate electric power, the wind turbine system comprising a wind turbine comprising a rotor blade system, an electric generator connected to be driven by the rotor blade system, a tower with a nacelle for housing the electric generator, and a medium voltage converter system configured to convert electric power generated by the electric generator, a housing with an enclosure for enclosing at least the medium voltage converter system, wherein an access door serves to block access when locked or allows a person to access the enclosure when unlocked, wherein the access door has a controllable locking mechanism to switch between locked and unlocked, an access control system comprising a processor arranged to receive a request for access to the enclosure from outside the enclosure, and wherein the access control system is arranged to execute a safety access algorithm in response to said request, wherein said safety access algorithm causes the access control system to:

open at least one circuit breaker or contactor to disconnect electrical connection between the circuit breaker or contactor and at least one of incoming or outgoing electric terminals connected to the medium voltage converter system, activate at least one motorized actuator to draw out said at least one circuit breaker or contactor to provide a physical separation between the at least one circuit breaker or contactor and the at least one of incoming or outgoing electric terminals connected to the medium voltage converter system, receive a feedback signal indicating that the at least one circuit breaker or contactor has been physically separated from the at least one incoming or outgoing electric terminals connected to the medium voltage converter system, transmit, in response to receipt of said feedback signal, a feedback signal to outside the enclosure, indicating that the at least one circuit breaker or contactor has been physically separated from the at least one incoming or outgoing electric terminals connected to the medium voltage converter system, activate a discharge procedure to allow electrical self-discharge of at least one AC-filter capacitor connected to filter harmonic components from the medium voltage converter system, wherein the AC filter capacitor is arranged inside the enclosure, activate a discharge procedure to electrically discharge one or more DC capacitors inside the medium voltage converter system, and to determine if a discharge criterion for discharge of said one or more DC capacitor has been met, activate at least one grounding switch to electrically ground the medium voltage converter system inside the enclosure, in case said discharge criterion for discharge of said one or more capacitors has been met and after receipt that the at least one circuit breaker or contactor has been physically separated from the at least one incoming or outgoing electric terminals connected to the medium voltage converter system, and activate the controllable locking mechanism to unlock the access door to gain access to the enclosure.

Such wind turbine system is advantageous since it allows a ground based housing, e.g. a simple container, to enclose the MV converter and associated AC filter capacitors and DC cell capacitors. This allows easy and fast access when service is required for planned maintenance or in case of faults in the MV equipment. E.g. time needed to enter the wind turbine nacelle is saved, and via the described automated access control, safe access can be provided with a minimum of time involved and eliminating the risk of human errors in case of a manual execution of the safety steps. At the same time, non-electrical service technician can perform maintenance of the more mechanical installations in the nacelle and/or tower.

The method allows use of modular multilevel converters (MMCs) operating in the MV range which have a number of advantages in conversion of electric energy from wind turbines.

The mentioned electric switches or circuit breakers with motorized draw-out feature for providing a physical (and visible) separation between contact elements, are standard components, and thus the system can be implemented by means of well-known components.

By "Medium Voltage" (MV) is understood an electric AC voltage having an RMS value of above 1 kV, such as 1-35 kV. Thus, for a person to approach such MV equipment safety procedure needs to be followed to prevent lethal accidents.

In the following, preferred embodiments and features will be described.

The housing preferably comprises a control compartment, and wherein said access door serves to gain access from the control compartment to said enclosure. Especially, the control compartment is permissible for entrance from outside, so as to allow a service person to request access to the restricted enclosure with the MV equipment. The service person can wait in the control compartment for the access procedure to be performed. Preferably, the access door to the MV compartment is arranged in a wall separating the enclosure and the control compartment. The control compartment may have a lockable door to allow access from outside with a key or code to unlock the door.

The housing is preferably arranged for position at a distance from the tower, preferably the housing is arranged for position on the ground. Ground position next to the wind turbine tower allows easy access to MV equipment service without the need to access the tower or even the nacelle. The housing may further comprise a switchgear compartment for enclosing electric switchgear for controlling electric power connection between the wind turbine and an electric power network. Especially, the switchgear compartment may be located adjacent to the enclosure for the MV equipment. The switchgear compartment may further comprise a transformer as well as the circuit breaker(s) and/or contactor(s) for disconnecting the MV converter system. There may be a door with a separate locking system with a separate safety procedure to allow access to the switchgear compartment from the enclosure with the MV equipment. The at least one circuit breaker or contactor is preferably positioned inside the switchgear compartment.

The wind turbine system may further comprise a user interface arranged outside the enclosure, wherein the user interface is arranged to transmit a request for access to the access control system in response to a user input. Especially, the access control system is arranged to transmit said feedback signal indicating that the at least one circuit breaker or contactor has been physically separated from the at least one incoming or outgoing electric terminals connected to the medium voltage converter system to the user interface. This allows a user to follow the steps of execution of the access procedure, e.g. by means of a visible and/or audible interface. Preferably, the user interface is positioned inside a control compartment.

The access control system is preferably arranged to determine if said discharge criterion is met by performing at least one of: 1) sensing a voltage indicative of a charge voltage of the at least one capacitor, and 2) awaiting a predetermined time after activation of said discharge procedure. A voltage level of such as 50-100 V, such as 60-80 V, may be selected in case of 1) as an acceptable voltage level where the ground switch can be activated. In case of 2), the predetermined time may be selected as the time required to discharge to an acceptable voltage level including a safety margin. Thus, preferably this predetermined time is selected to match the specific capacitor(s) and discharging circuit. The discharge procedure may comprise engaging at least one dump resistor to discharge at least one capacitor. Preferably, the AC filter capacitor(s) are self-discharged and a timer run-out of such as 5-10 minutes is used as a discharge criterion. For the discharge of the one or more DC capacitors, one of the above discharge criteria can be used.

The access control system may further be arranged to
    open at least two circuit breakers or contactors to disconnect electrical connection between the at least two circuit breakers or contactors and at least one of incoming or outgoing electric terminals connected to the medium voltage converter system,
    activate at least two motorized actuators to draw out said at least two circuit breakers or contactors to provide a physical separation between the at least two circuit breakers or contactors and the at least one of incoming or outgoing electric terminals connected to the medium voltage converter system, and
    transmit a feedback signal indicating that the respective at least two circuit breakers or contactors have been physically separated from the at least one incoming or outgoing electric terminals connected to the medium voltage converter system.

A second circuit breaker or contactor may preferably serve to electrically connect or disconnect the medium voltage converter system to a pre-charge circuit branch, Still further, a second grounding switch may be activated, following the above steps related to the second circuit breaker or contactor.

Preferably; the medium voltage converter system may comprise modular type medium voltage converters, most preferably multi-level modular type converters (MMC). The MV converter system may comprise an AC-DC and/or a DC-AC converter.

Especially, the access control system may be arranged to
    activate at least two grounding switches to electrically ground the medium voltage converter system at respective circuit branches, in case said discharge criterion for discharge said one or more capacitors has been met and after receipt that the at least two circuit breakers or contactors have been physically separated from the at least one incoming or outgoing electric terminals connected to the medium voltage converter system, and
    activate the controllable locking mechanism to unlock the access door to gain access to the enclosure, after the at least two grounding switches have been activated.

The housing serving to form the enclosure for MV equipment may be formed by a metal frame onto which the floor, a plurality of wall elements, and the top part are mounted. In a preferred embodiment the housing is formed by a standard size metal container placed on the ground near the wind turbine tower.

Preferably, the wind turbine system is designed for 3-phase AC thus all AC electric components described above are preferably 3-phase components.

The wind turbine may be capable of generating an electric power of at least 1 MW, such as 2-10 MW, or more.

In a second aspect, the invention provides a method for gaining access to a medium voltage converter system configured to convert electric power from a wind turbine generator, wherein the medium voltage converter system is arranged in an enclosure with an access door allowing a person to access the enclosure when unlocked or block access when locked, wherein the access door has a controllable locking mechanism, the method comprising
    receiving a request for access from outside the enclosure, and in response to said request for access performing the steps of:
        opening at least one circuit breaker or contactor to disconnect electrical connection between the circuit breaker or contactor and at least one of incoming or outgoing electric terminals connected to the medium voltage converter system,
        drawing out said at least one circuit breaker or contactor by means of a motorized actuator to provide a physical separation between the at least one circuit breaker or contactor and the at least one of incoming or outgoing electric terminals connected to the medium voltage converter system,
        receiving feedback that the at least one circuit breaker or contactor has been physically separated from the at least one incoming or outgoing electric terminals connected to the medium voltage converter system, feeding back information to outside the enclosure, that the at least one circuit breaker or contactor has been physically separated from the at least one incoming or outgoing electric terminals connected to the medium voltage converter system, activating a discharge procedure to allow electrical self-discharge of at least one AC-filter capacitor connected to filter harmonic components from the medium voltage converter system, activating a discharge procedure to electrically discharge at least one DC capacitor inside the medium voltage converter system, determining if a discharge criterion for discharge of the at least one AC-filter capacitor and the at least one DC capacitor has been met, in case said discharge criterion has been met and after receipt that the at least one circuit breaker or contactor has been physically separated from the at least one incoming or outgoing electric terminals connected to the medium voltage converter system, activating at least one grounding switch to electrically ground the medium voltage converter system, and activating the controllable locking mechanism to unlock the access door to the enclosure to gain access to the enclosure.

In a third aspect, the invention provides a method for performing service on a medium voltage converter system forming part of a wind turbine system, the method comprises a person gaining access to the medium voltage converter system according to the method of the second aspect.

It is to be understood that the same advantages and preferred embodiments and features apply for the second and third aspects, as described for the first aspect, and the aspects may be mixed in any way.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
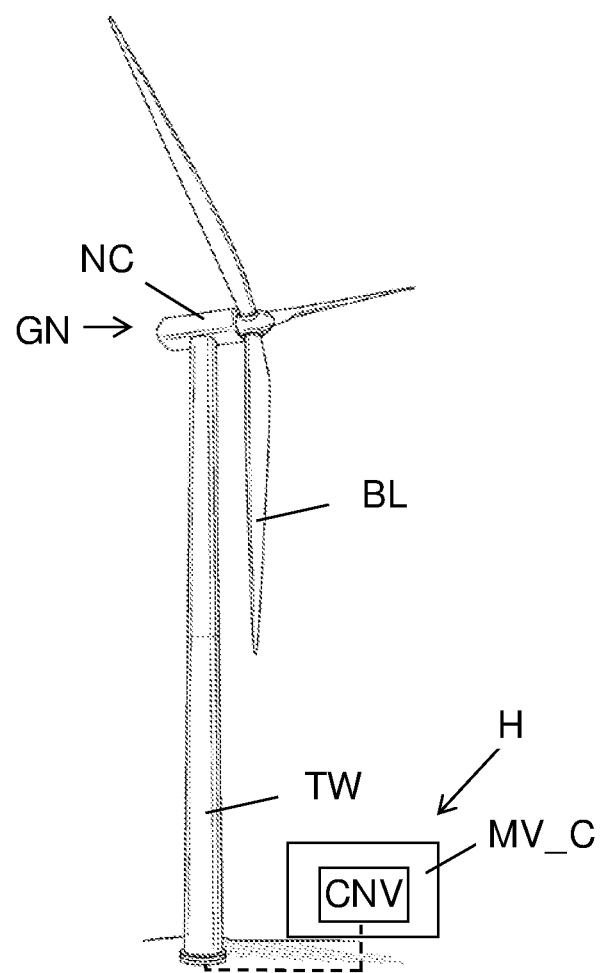
FIG. 1 illustrates a wind turbine system embodiment with a wind turbine and an external ground based housing enclosing a medium voltage (MV) converter system connected to the wind turbine generator.

FIG. 1 illustrates a wind turbine system embodiment. The wind turbine has three rotor blades BL for driving an electric generator GN located inside the nacelle NC on top of a tower TW. A Medium Voltage (MV) power converter system CNV is connected to the electric generator of the wind turbine, and this converter CNV is positioned inside an enclosure MV_C provided by a housing H, preferably a housing with a floor, wall elements, and a top part serving to provide an enclosed space MV_C preventing unauthorized access to the MV equipment. In the following an automated procedure for access to the enclosure MV_C through access doors with controllable locks will be described. Such procedure allows fast and yet safe access for service of the MV converter and further MV equipment inside the enclosure MV_C.

Figure 2:
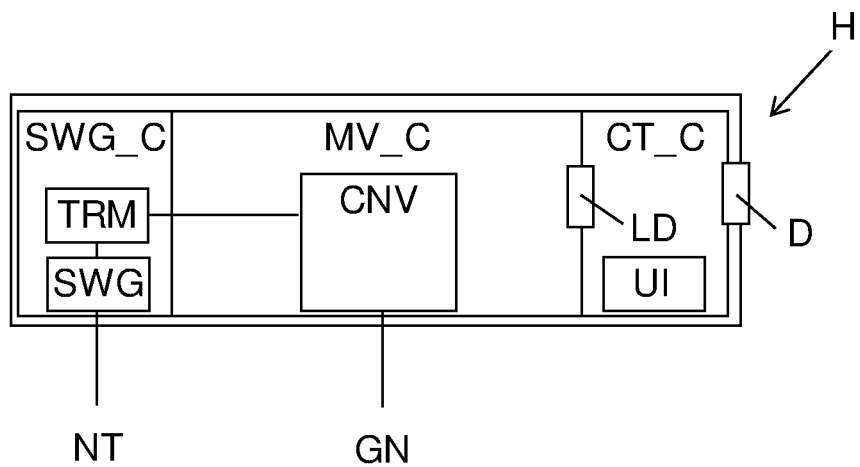
FIG. 2 illustrates an embodiment of the housing.

FIG. 2 shows an embodiment of the housing H of FIG. 1. The housing H may be formed by a standard metal container in which two walls are inserted to provide three separate compartments: a control compartment CT_C in one end, an MV compartment MV_C which forms the enclosure for the MV converter system CNV connected to the wind turbine generator GN, and at the opposite end a switchgear compartment SWG_C enclosing switchgear SWG and a transformer TRM for connection of the wind turbine system to the public electric network NT, as well as necessary circuit breakers or contactors for electrically de-connecting the MV compartment MV_C. A door D allows a person to access the control compartment CT_C in which a user interface UI allows the person to request access to the MV compartment MV_C, e.g. by pushing a button, operating a handle or a touch sensitive display etc. An access door LD with a controllable locking mechanism serves to block access to the MV compartment MV_C unless the MV equipment therein has been disconnected and de-energized through a safety procedure to avoid any lethal accidents by access.

The user interface is connected to an access control system which in response to the access request initiates an automated safety procedure ending by unlocking the access door LD to the MV compartment MV_C.

The necessary circuit breaker(s) and/or contactor(s) and corresponding motorized draw-out actuator(s) used for disconnection of the MV converter system CNV are preferably positions inside the switchgear compartment SWG_C.

Figure 3:
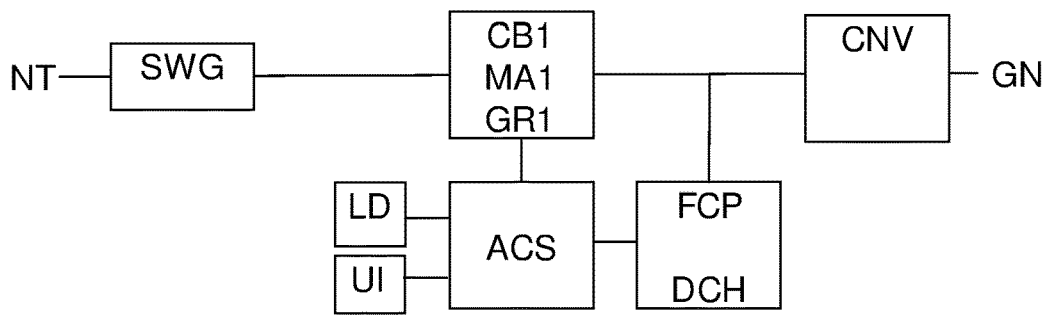
FIG. 3 illustrates a block diagram of the access control system.

FIG. 3 illustrates a block diagram of an embodiment with the access control system ACS having a processor which is programmed to perform a safety access algorithm to allow access via the access door LD to the MV compartment in response to an access request from the user interface UI by controlling the locking mechanism of the access door LD to open after the safety procedure has been completed, thus ensuring that all necessary steps have been performed for eliminating personal contact with any electrically hazardous MV parts inside the MV compartment. The access control system ACS first opens a circuit breaker CB1 to disconnect electrical connection between the circuit breaker and incoming or outgoing electric terminals connected to the MV converter system CNV. Next, a motorized actuator MA1 is activated to draw out the circuit breaker CB1, or at least a part of it, to provide a physical separation between the circuit breaker CB1 the incoming or outgoing electric terminals connected to the MV converter CNV. The access control system ACS awaits a feedback signal indicating that the physical separation of the circuit breaker CB1 has been established, and in response, it transmits a feedback signal to the user interface UI indicating that the physical separation has been completed, Next, a self discharge procedure is activated to electrically discharge one or more AC-filter capacitors FCP connected to filter harmonic components from the MV converter system CNV. Further, a discharge circuit DCH including dump resistors can be activated to perform the discharging in a controlled manner, or the AC-filter capacitors FCP may be self-discharged by already connected discharge resistors. During the discharging, the access control system may determine whether a discharge criterion for the discharge of the AC-filter capacitor(s) FCP has been met, e.g. by sensing a charged voltage of the AC-filter capacitor(s) FCP and compare it with a predetermined threshold voltage, e.g. 75 V, or by merely starting a timer and wait for a predetermined period to lapse, e.g. 5 minutes or 10 minutes or the like. Further, a discharge procedure is activated for electrical discharge of DC cell capacitors forming part of the MV converter system CNV. When the discharge criterion for the AC filter capacitor(s) FCP and the DC cell capacitors are both met, and the physical separation of the circuit breaker CB1 has been established by means of the motorized actuator, a ground switch GR1 is activated to electrically ground the MV converter CNV. Finally, after this electrical grounding, the kick of the access door LD is controlled to open the access door LD to gain access to the MV compartment.

The safety access algorithm may comprise further steps of activating switches or circuit breakers, motorized physical separations as well as grounding switches to disconnect further electrical branches which have components placed inside the MV compartment, e.g. an electric branch serving to pre-charge the MV converter CNV before the ground switch GR1 is activated to perform the electrical grounding. Furthermore, a further ground switch may be used to ensure safe access for further enclosures, e.g. switchgear SWG.

In some cases, further automated and/or motorized switches or circuit breakers as well as grounding switches are included in the safety access algorithm, and further the automated procedure may comprise providing access to the switchgear SWG and thus opening the HV switchgear for disconnecting from the public network NT as well as subsequently electrically grounding of the switchgear SWG.

Figure 4:
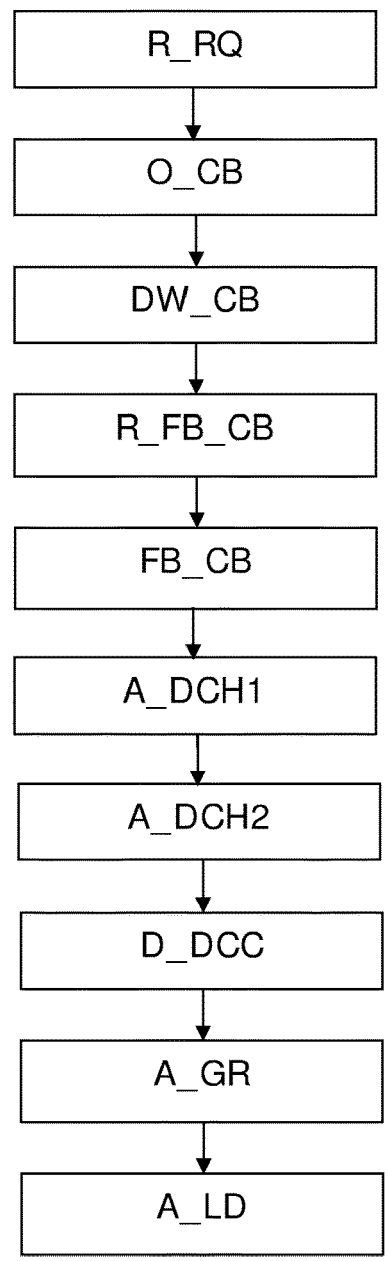
FIG. 4 illustrates steps of a method embodiment.

FIG. 4 illustrates steps of a method embodiment starting with receiving a request R_RQ for access from outside the user interface outside the MV compartment. This initiates the following steps, including opening O_CB a circuit breaker to disconnect electrical connection between the circuit breaker and incoming or outgoing electric terminals connected to the MV converter. After this, drawing out DW_CB at least a part of the circuit breaker by activating a motorized actuator to provide physical separation between the circuit breaker and MV converter. When receiving R_FB_CB feedback that the circuit breaker has been physically separated from the MV converter, information is fed back FB_CB to the user interface that physical separation is completed. After this, a discharge procedures A_DCH1 and A_DCH2 are activated to electrically discharge AC-filter capacitors connected to filter harmonic components from the MV converter and to electrically discharge one or more DC capacitors inside the MV converter. The safety access algorithm then determines D_DCC if a discharge criterion for discharge of the AC-filter capacitors and the DC capacitors has been met, e.g. by checking a simple tinier to have reached a predetermined time period, or sensing if charging voltage has dropped to a predetermined charge voltage threshold. If the discharge criterion is met, a grounding switch A_GR is activated to electrically ground the MV converter. Finally, when grounded, activating A_LD the locking mechanism to unlock the access door to the enclosure to gain access to the enclosure.

In preferred embodiments, the method may comprise opening a second circuit breaker or contactor and providing physical separation by means of a motorized actuator, before the access door is opened to gain access to the enclosure with the MV converter system. Especially, such second circuit breaker or contactor serves to disconnect a pre-charge circuit branch from the MV converter system.

Figure 5:
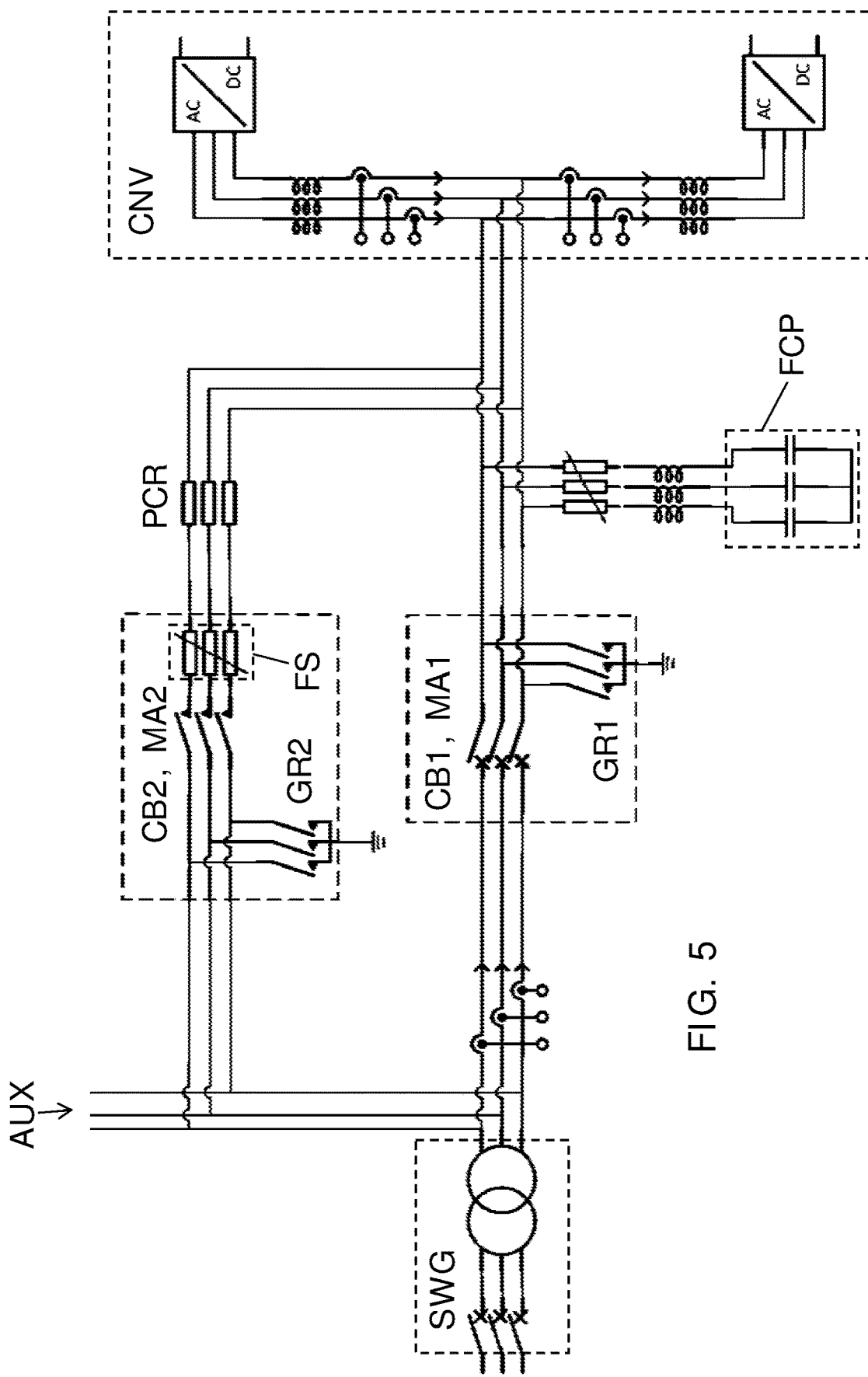
FIG. 5 illustrates an electric diagram of an embodiment.

It is to be understood that the access control system is preferably further arranged to reverse the process after request from the user having left the MV compartment, e.g. by operating the user interface in the control compartment. The access door is then locked to block access, and the grounding switch(es), motorized actuator(s) and electric contactor(s) or circuit breaker(s) are then operated to a normal function mode where all MV components are connected, FIG. 5 illustrates an electric circuit diagram of vital parts of a wind turbine system for 3-phase connection to the electric public network via a transformer and switchgear SWG. The circuit includes circuit breakers CB1, CB2, motorized actuators MA1, MA2 to provide electric disconnection and physical separation of contact elements, and grounding switch GR1 for electrically grounding to ensure zero voltage at electrically conducting elements before gaining access to the MV compartment, as explained in the above description. Grounding switch GR2 can be activated in case access to the switchgear SWG compartment is necessary. Especially, access to the switchgear SWG compartment may be necessary to service circuit breakers/contactors CB1, CB2. The system comprises a modular MV converter system CNV including modular cells for DC-AC conversion of electric power from the wind turbine generator, and an AC filter capacitor bank ECP for filtering harmonic components from the line side converter (LSC). LSC is connected to the switchgear SWG via circuit breaker CB1, and further LSC is connected to the switchgear SWG via pre-charge resistors PCR, which can be disconnected by circuit breaker/contactor CB2. The pre-charge resistors PCR are further connected via fuses FS. Before electrically grounding by means of the grounding switches GR1 and GR2, DC cell capacitors (not shown) in the MV converter system CNV should be discharged to a voltage below a predetermined threshold e.g. 50 V. Still further, the switchgear SWG is connected to still another circuit branch, namely to provide power to auxiliary circuits AUX, e.g. via a transformer. Such auxiliary circuits are preferred to operate also in case of service being performed on the MV converter system CNV and related circuits. Especially, the auxiliary circuits AUX include vital functions of the wind turbine, such as powering hydraulics and controlling yaw and pitch etc.

All of the components CB1, CB2, MA1, MA2, GR1, GR2, as well as 33/66 kV circuit breakers(s) are all intended to be physically positioned inside a separate switchgear compartment, i.e. an enclosure separate from the enclosure housing the MV converter system CNV. Normally, the switchgear SWG is associated with equipment for 33 or 66 kV circuit breakers in turbines having Low Voltage Converters. However, in a wind turbine with a MV converter system, the switchgear SWG involves 33 (or 66 kV) circuit breakers as well as MV (1-35 kV) circuit breakers and their related equipment (motorized actuators MA1, MA2 and ground switches GR1, GR2).

The electrical switches or circuit breakers/contactors CB1, CB2 with motorized actuators MA1, MA2 for providing physical and visible separation of contact elements are commercially available and thus standard components for MV equipment. The discharge circuit necessary for automatically discharging the AC-filter capacitors FCP (as well as e.g. sensing charge voltage of the capacitors FCP) is not shown, but such circuit is also known by the skilled person.

The access control system may be implemented as a computerized system involving such as a DSP, a PLC, an FPPA or the like with a processor and associated memory in which the safety access algorithm is stored. The access control system may be wired and/or wirelessly connected to control the circuit breaker(s), motorized actuator(s), user interface (for receipt of request by a user and feeding back information of the safety access procedure), as well as to automatic discharge circuit and to operate the controllable access door locking mechanism.

To sum up: the invention provides a wind turbine system with a medium voltage (MV) converter system for converting electric power by the wind turbine generator. A housing, e.g. a placed on the ground near the wind turbine tower, encloses the MV converter system and some other related components, to block access. An access door with a controllable locking mechanism is controlled by an access control system which unlocks the access door after execution of a safety access algorithm. This algorithm involves activating electrical disconnection of the MV converter and activating motorized actuators to provide a physical separation between the electric terminals connected to the MV converter system. A feedback signal is transmitted to outside the enclosure, that the physical separation has been established. Further, a discharge procedure is activated to electrically discharge at least one AC-filter capacitor connected to filter harmonic components from the MV converter system as well as discharging of DC cell capacitors inside the MV converter system. When said physical separation is established and a discharge criterion is met for discharge of the AC-filter capacitor and DC cell capacitors, a grounding switch is activated to electrically ground the MV converter system, and subsequently, the access doors are unlocked. This allows a person to provide service to the potentially dangerous MV equipment in a safe and automated way after request. The housing preferably has a control compartment where a person can request access and await opening of the access door for safe access to the MV converter system.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine system arranged to generate electric power, the wind turbine system comprising:
   a wind turbine comprising a rotor blade system, an electric generator connected to be driven by the rotor blade system, a tower with a nacelle for housing the electric generator; and
   a medium voltage converter system (CNV) configured to convert electric power generated by the electric generator;
   a housing with an enclosure for enclosing at least the medium voltage converter system, wherein an access door blocks access when locked or allows a person to access the enclosure when unlocked, wherein the access door has a controllable locking mechanism to switch between locked and unlocked;
   an access control system comprising a memory and a processor arranged to receive a request for access to the enclosure from outside the enclosure, and wherein the access control system is arranged to execute a safety access algorithm stored on the memory in response to said request, wherein execution of said safety access algorithm by the processor causes the access control system to:
   open at least one circuit breaker or contactor to disconnect electrical connection between the circuit breaker or contactor and at least one of incoming or outgoing electric terminals connected to the medium voltage converter system;
   activate at least one motorized actuator to draw out said at least one circuit breaker or contactor to provide a physical separation between the at least one circuit breaker or contactor and the at least one of incoming or outgoing electric terminals connected to the medium voltage converter system;
   receive a feedback signal indicating that the at least one circuit breaker or contactor has been physically separated from the at least one incoming or outgoing electric terminals connected to the medium voltage converter system;
   cause, in response to receipt of said feedback signal, transmission of a feedback signal to a user interface located outside the enclosure, indicating that the at least one circuit breaker or contactor has been physically separated from the at least one incoming or outgoing electric terminals connected to the medium voltage converter system;
   activate a first discharge procedure to allow electrical self-discharge of at least one AC-filter capacitor connected to filter harmonic components from the medium voltage converter system;
   activate a second discharge procedure to electrically discharge one or more DC capacitors inside the medium voltage converter system, and to determine if a discharge criterion for discharge of said one or more DC capacitors has been met, wherein the access control system is arranged to determine if said discharge criterion for discharge of at least one DC capacitor of the one or more DC capacitors is met by performing at least one of: 1) determining that a sensed voltage indicative of a charge voltage of the at least one DC capacitor has reached a predetermined threshold voltage; or 2) determining that a predetermined time has lapsed after activation of said second discharge procedure;
   activate at least one grounding switch to electrically ground the medium voltage converter system inside the enclosure, in case said discharge criterion for discharge said one or more capacitors has been met and after receipt that the at least one circuit breaker or contactor has been physically separated from the at least one incoming or outgoing electric terminals connected to the medium voltage converter system; and
   activate the controllable locking mechanism to unlock the access door to gain access to the enclosure, after the at least one grounding switch has been activated.

2. The wind turbine system according to claim 1, wherein the housing comprises a control compartment, and wherein said access door serves to gain access from the control compartment to said enclosure for enclosing at least the medium voltage converter system.

3. The wind turbine system according to claim 1, wherein the housing is arranged for position at a distance from the tower.

4. The wind turbine system according to claim 1, wherein the housing is arranged for position on the ground.

5. The wind turbine system according to claim 1, wherein the housing comprises a switchgear compartment for enclosing electric switchgear for controlling electric power connection between the wind turbine and an electric power network, wherein the switchgear compartment is located adjacent to the enclosure for enclosing at least the medium voltage power converter system.

6. The wind turbine system according to claim 5, wherein the at least one circuit breaker or contactor is positioned inside the switchgear compartment.

7. The wind turbine system according to claim 1, wherein the user interface is arranged to transmit the request for access to the access control system in response to a user input.

8. The wind turbine system according to claim 1, wherein the access control system is further arranged to:
  open at least two circuit breakers or contactors to disconnect electrical connection between the at least two circuit breakers or contactors and at least one of incoming or outgoing electric terminals connected to the medium voltage converter system;
  activate at least two motorized actuators to draw out said at least two circuit breakers or contactors to provide a physical separation between the at least two circuit breakers or contactors and the at least one of incoming or outgoing electric terminals connected to the medium voltage converter system; and
  transmit a feedback signal indicating that the at least two circuit breakers or contactors have been physically separated from the at least one incoming or outgoing electric terminals connected to the medium voltage converter system.

9. The wind turbine system according to claim 8, wherein one of said at least two circuit breakers or contactors serves to electrically connect or disconnect the medium voltage converter system to a pre-charge circuit branch.

10. The wind turbine system according to claim 8, wherein the access control system is arranged to:
  activate at least two grounding switches to electrically ground the medium voltage converter system at respective circuit branches, in case said discharge criterion for discharge said one or more capacitors has been met and after receipt that the at least two circuit breakers or contactors have been physically separated from the at least one incoming or outgoing electric terminals connected to the medium voltage converter system; and
  activate the controllable locking mechanism to unlock the access door to gain access to the enclosure, after the at least two grounding switches have been activated.

11. The wind turbine system according to claim 1, wherein the medium voltage converter system comprises a modular type medium voltage converter.

12. A method for gaining access to a medium voltage converter system configured to convert electric power from a wind turbine generator of a wind turbine, wherein the medium voltage converter system is arranged in an enclosure with an access door, wherein the access door has a controllable locking mechanism, the method comprising:
  receiving, by a processor of an access control system, a request for access from outside the enclosure, and in response to said request for access, the processor is arranged to execute a safety access algorithm stored on a memory of the access control system, wherein in executing the safety access algorithm the processor causes the access control system to perform:
    opening at least one circuit breaker or contactor to disconnect electrical connection between the circuit breaker or contactor and at least one of incoming or outgoing electric terminals connected to the medium voltage converter system;
    drawing out said at least one circuit breaker or contactor by a motorized actuator to provide a physical separation between the at least one circuit breaker or contactor and the at least one of incoming or outgoing electric terminals connected to the medium voltage converter system;
    receiving feedback that the at least one circuit breaker or contactor has been physically separated from the at least one incoming or outgoing electric terminals connected to the medium voltage converter system;
    causing feeding back of information to a user interface located outside the enclosure, that the at least one circuit breaker or contactor has been physically separated from the at least one incoming or outgoing electric terminals connected to the medium voltage converter system;
    activating a first discharge procedure to allow electrical self-discharge at least one AC-filter capacitor connected to filter harmonic components from the medium voltage converter system;
    activating a second discharge procedure to electrically discharge at least one DC capacitor inside the medium voltage converter system;
    determining that a discharge criterion for discharge of the at least one AC-filter capacitor and the at least one DC capacitor has been met,
      wherein determining that said discharge criterion for discharge of the at least one AC-filter capacitor is met comprises performing at least one of: 1) determining that a sensed voltage indicative of a charge voltage of the at least one AC-filter capacitor has reached a predetermined threshold voltage; or 2) determining that a predetermined time has lapsed after activation of said first discharge procedure, and
      wherein determining that said discharge criterion for discharge of at least one DC capacitor of the one or more DC capacitors is met comprises performing at least one of: 1) determining that a sensed voltage indicative of a charge voltage of the at least one DC capacitor has reached a predetermined threshold voltage; or 2) determining that a predetermined time has lapsed after activation of said second discharge procedure;
    in case said discharge criterion has been met and after receipt that the at least one circuit breaker or contactor has been physically separated from the at least one incoming or outgoing electric terminals connected to the medium voltage converter system, activating at least one grounding switch to electrically ground the medium voltage converter system; and
    activating the controllable locking mechanism to unlock the access door to the enclosure to gain access to the enclosure after the at least one grounding switch has been activated.

13. The method according to claim 12, wherein a housing forming the enclosure also comprises a control compartment, and wherein said access door serves to gain access from the control compartment to said enclosure for enclosing at least the medium voltage converter system.

14. The method according to claim 12, wherein a housing forming the enclosure is arranged for position at a distance from a tower of the wind turbine.

15. The method according to claim 12, wherein a housing forming the enclosure is arranged for position on the ground.

16. The method according to claim 12, wherein a housing forming the enclosure also comprises a switchgear compartment for enclosing electric switchgear for controlling electric power connection between the wind turbine generator and an electric power network, wherein the switchgear compartment is located adjacent to the enclosure for enclosing at least the medium voltage power converter system.

17. A non-transitory memory storing a safety access algorithm that, when executed by a processor of an access control system for a wind turbine system in response to receiving a request for access to an enclosure from outside the enclosure, causes the processor to:
   open at least one circuit breaker or contactor to disconnect electrical connection between the circuit breaker or contactor and at least one of incoming or outgoing electric terminals connected to a medium voltage converter system, the medium voltage converter system being configured to convert electric power generated by an electric generator of a wind turbine;
   activate at least one motorized actuator to draw out said at least one circuit breaker or contactor to provide a physical separation between the at least one circuit breaker or contactor and the at least one of incoming or outgoing electric terminals connected to the medium voltage converter system;
   receive a feedback signal indicating that the at least one circuit breaker or contactor has been physically separated from the at least one incoming or outgoing electric terminals connected to the medium voltage converter system;
   cause, in response to receipt of said feedback signal, information to be transmitted to a user interface located outside the enclosure, the information indicating that the at least one circuit breaker or contactor has been physically separated from the at least one incoming or outgoing electric terminals connected to the medium voltage converter system;
   activate a first discharge procedure to allow electrical self-discharge of at least one AC-filter capacitor connected to filter harmonic components from the medium voltage converter system;
   activate a second discharge procedure to electrically discharge one or more DC capacitors inside the medium voltage converter system;
   activate at least one grounding switch to electrically ground the medium voltage converter system inside the enclosure when a discharge criterion for discharge of said one or more DC capacitors has been met and after receipt that the at least one circuit breaker or contactor has been physically separated from the at least one incoming or outgoing electric terminals connected to the medium voltage converter system, wherein the processor is arranged to determine if said discharge criterion for discharge of at least one DC capacitor of the one or more DC capacitors is met by performing at least one of: 1) determining that a sensed voltage indicative of a charge voltage of the at least one DC capacitor has reached a predetermined threshold voltage; or 2) determining that a predetermined time has lapsed after activation of said second discharge procedure; and
   activate a controllable locking mechanism to unlock an access door to gain access to the enclosure, after the at least one grounding switch has been activated.

* * * * *